United States Patent [19]

Dushku

[11] E Re. 30,533

[45] Reissued Mar. 3, 1981

[54] MANUALLY OPERATED LOG BREAKING DEVICE

[76] Inventor: Victor A. Dushku, Rackarbergsgatan 34, 2 TR., 752 32 Uppsala, Sweden

[21] Appl. No.: 50,121

[22] Filed: Jun. 19, 1979

Related U.S. Patent Documents

Reissue of:

[64] Patent No.: 4,030,700
Issued: Jun. 21, 1977
Appl. No.: 706,379
Filed: Jul. 19, 1976

[30] Foreign Application Priority Data

Aug. 29, 1975 [GB] United Kingdom ..... 35810/75

[51] Int. Cl.[3] ..... B66F 15/00

[52] U.S. Cl. ..... 254/113; 144/34 A; 254/104; 254/131

[58] Field of Search ..... 254/113, 122, 123, 120, 254/131, 104, 8 B, 9 B, 10 B; 144/34 R, 34 A, 34 B, 193

[56] References Cited

U.S. PATENT DOCUMENTS

| | | | |
|---|---|---|---|
| 1,380,405 | 6/1921 | Mulvane | 254/122 |
| 1,480,046 | 1/1924 | Carter | 254/122 |
| 2,504,176 | 4/1950 | Brehmer | 254/104 |
| 3,548,899 | 12/1970 | Emerson | 144/34 B |

*Primary Examiner*—Robert C. Watson

*Attorney, Agent, or Firm*—Roylance, Abrams, Berdo & Farley

[57] ABSTRACT

A manually operated log breaking device with a longitudinally extending lever member having a first pressure plate attached at one end portion and a second pressure plate attached to the first pressure plate in a hinged relationship, two sets of lever members extending from the first and second pressure plates in a hinged relationship to same and at the free end portions joined in a hinged relationship to a third set of lever members, having a third pressure plate attached in a hinged relationship at the free end portion of the third set of lever members, the pressure plates and lever members coacting as a link or gear system for increasing the resulting power of a manual force applied to the free end portion of the longitudinally extending lever member.

12 Claims, 6 Drawing Figures

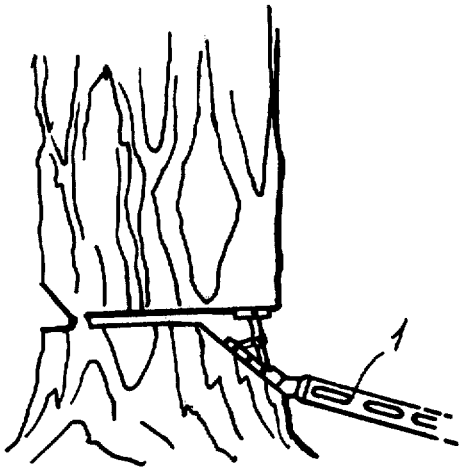
Fig. 1
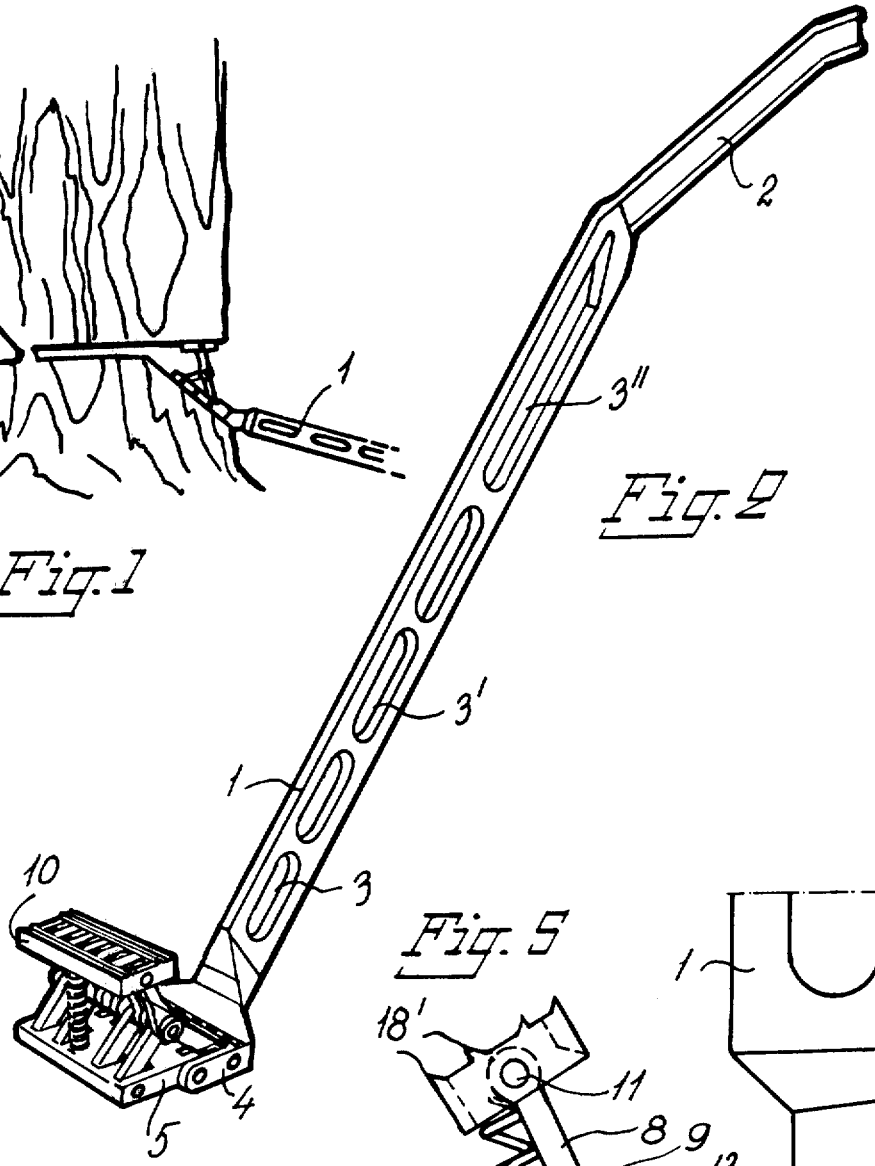
Fig. 2
Fig. 5
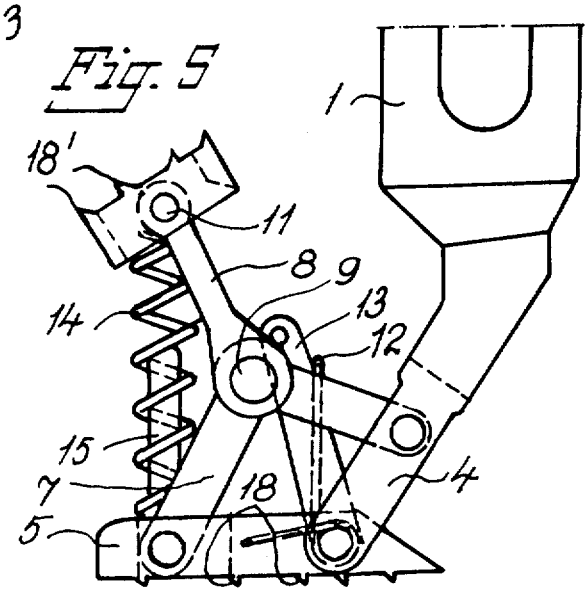

MANUALLY OPERATED LOG BREAKING DEVICE

Matter enclosed in heavy brackets [ ] appears in the original patent but forms no part of this reissue specification; matter printed in italics indicates the additions made by reissue.

This invention relates to a mechanically operated log breaking device, and particularly to a device to be used for directed felling of rooted trees.

Today's most common log breaking device, based on a simple lever inserted into the saw cut of a tree, has serious shortcomings. After a manual force is applied, the lever often gives too low a resulting force, it often sinks into soft-wooded trees rendering the lever ineffective, and it even breaks after a short time since modern saw chains leave a saw track too thin for a structurally strong and practical lever design. The low resulting force is a serious limitation because loggers, trying to fell large trees or trees which generally lean back, often cannot exert a force sufficient for directed felling of such trees without greatly increasing the applied force, thereby risking injuries to the back. To increase the force exchange other more complicated devices, such as hydraulic lifting jacks and hydraulic wedges, have been proposed but these devices being heavy, expensive, subject to oil leaks and breakdown as well as being too slow to operate, are neither suitable nor practical for the individual logger.

A principal object of the present invention is to disclose a novel device for the purpose set forth above, arranged to give a large resulting force from a small manually applied force.

Another object of the present invention is to disclose a novel device for the purpose set forth above, arranged to effectively distribute the large resulting forces on the reaction surfaces supporting the device.

A further object of the present invention is to disclose a device combining low weight with a simple and rigid design which is inexpensive to manufacture.

Yet a further object of the present invention is to disclose a log breaking device which is easy to use and efficient in operation for speeding up log production.

These and other objects and advantages in two embodiments of the invention are described and shown in the following specification and drawings, in which:

FIG. 1 is a side view of one device according to the present invention arranged in a working position at a rooted tree;

FIG. 2 is a perspective view of a preferred embodiment;

FIG. 5 is a side view corresponding to FIG. 4, showing the active part of the device in an actuated position.

Figure 3:
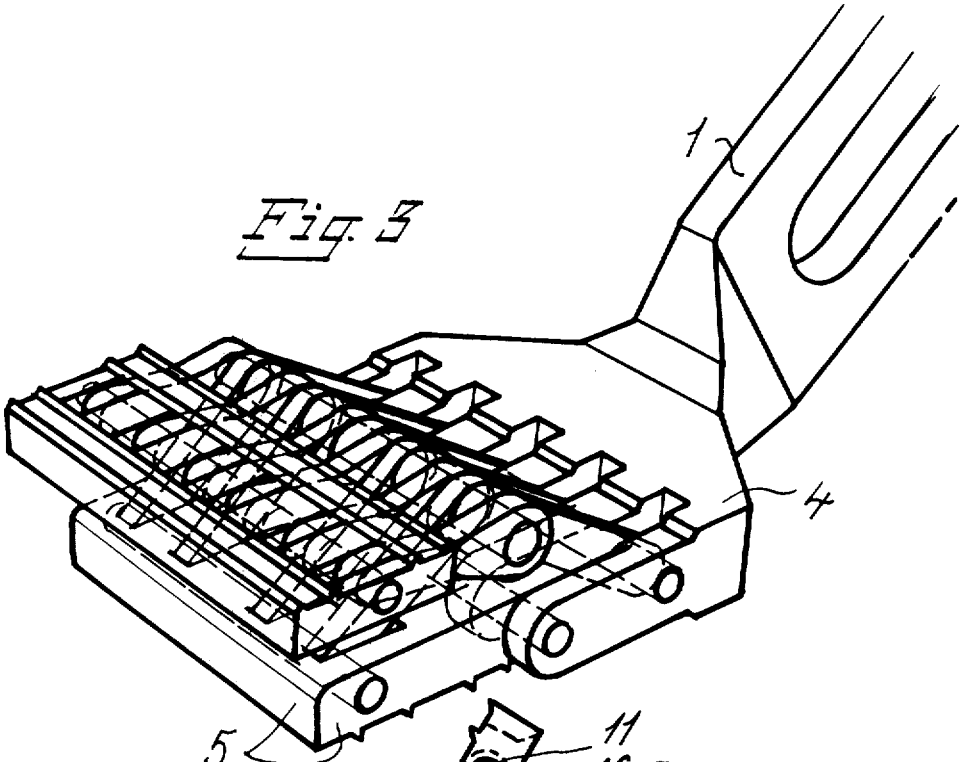
FIG. 3 is a perspective view of the active part of the device as shown in FIG. 2 but in different position.

A longitudinally extending lever 1 is arranged with a handle bar 2 included at an angle at the top end. The lever 1 is arranged with a number of longitudinally extending slots or punched out elongated openings 3, 3' and 3'', the length of the punch outs increasing from the lower part of the lever 1 towards the handle bar 2. The object of said punch outs 3, 3' and 3'' is to reduce the weight of the lever 1 with a minimum reduction in the strength of the lever 1. A first pressure plate 4 extends from the lower part of the lever 1 at an inclined angle, joined to a second pressure plate 5 in a hinged relationship by means of an axle or bolt 6. As shown in FIG. 3, the first and the second pressure plates 4 and 5 are arranged with a number of inter-digitated portions separated by grooves, in which a first and second set of lever members 6 and 7 are attached in a hinged relationship to the first and second pressure plates 4 and 5. The free end portions of said first and second sets of lever members 6 and 7 are joined together and to a third set of lever members 8 by means of a through bolt or axle 9. Said third set of lever members 8 are thus arranged in a hinged relationship to the joined end portions of the first and second set of lever members 6 and 7. A third pressure plate 10 is attached to the free end portions of the third set of lever members 8 by means of a through bolt or axle 11, i.e., also in a hinged relationship to the third set of lever members 8, thus allowing a free pivotal movement of the third pressure plate 10 in relation to said lever members 8.

In order to hold the lever mechanism the third pressure plate 10 in a position suitable for insertion into a saw cut, two different embodiments are shown. According to the embodiment shown in FIGS. 4 and 5, a first spring member 12 is arranged extending upward from the axle holding together the first and the second pressure plates 4 and 5 towards the third set of lever members 8, arranged to apply a force towards the second pressure plate 5 by means of a pivoting member 13, acting on the third set of lever members 8. A second spring member 14 is arranged extending from the second pressure plate 5, acting on the lower front surface of the third pressure plate 10. Said second spring member is arranged embracing a guiding member 15.

Figure 4:
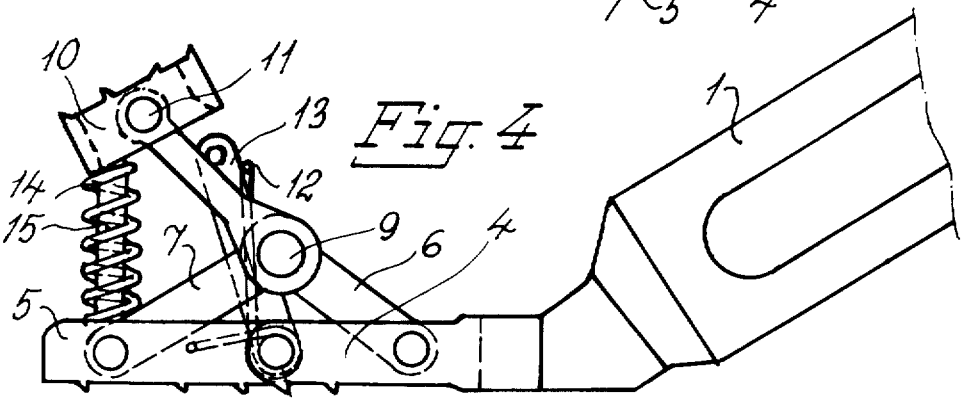
FIG. 4 is a side view of an embodiment of the active part of the device, shown in the non-actuated position.

As shown in FIG. 4, the third pressure plate 10 is held in a predetermined position under the influence of the force applied from the first and the second spring members 12 and 14. When the device is operated, i.e., when an upward manual force is applied to the handle bar 2, the mechanism takes the position shown in FIG. 5.

Figure 6:
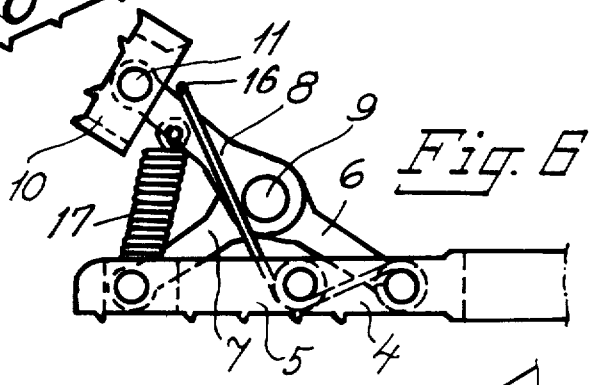
FIG. 6 is a side view corresponding to FIG. 5, showing a second embodiment of the active part of the device.

A second embodiment is shown in FIG. 6, including a first spring member 16 arranged to apply a force on the third set of lever members 8. A second spring member 17 is arranged extending between the second pressure plate 5 and the third set of lever members 8, arranged to act as a distance member between the second pressure plate 5 and the third set of lever members 8 when the device is inserted into a saw cut.

When the device is used, a wedge-shaped saw cut is made, as shown in FIG. 1, in order to provide an inclined lower surface suitable for the device. The device is then inserted such that the first and second pressure plates 4 and 5 rest on the aforementioned inclined surface while the third pressure plate 10 has firm contact with the upper surface of the wedge-shaped saw cut. An upward manual force is applied to the handle bar 2 so that the handle bar 2 and the lever 1 move upwards and away from the ground. The first pressure plate 4 pivots with respect to the second pressure plate 5 while the three sets of lever members 6, 7 and 8 move to a position as shown in FIG. 5. In order to prevent the device from slipping out of the tree, when actuated, the contact surfaces of the second and third pressure plates are arranged with outwardly projecting sharp members 18 and 18', arranged to increase the friction between said plates and the contact surfaces of the tree.

The lever mechanism in the device makes it possible to attain a resulting force previously never achieved with a manually operated mechanical device used for the purpose set forth. Thus, the risk of physical strain and even back injuries can be eliminated as the applied force necessary is generally small.

The large resulting forces produced by the lever mechanism in operation are distributed onto the reaction surfaces by the second and third pressure plates 5 and 10 in contact with these surfaces. An effective distribution of said forces on a tree can be achieved through proper arrangement of the sharp members 18 and 18' on the second and third pressure plates 5 and 10 and by proper selection of the angles which members 6, 7 and 8 make with respect to the second pressure plate 5.

The three sets of lever members 6, 7 and 8 can advantageously be of uniform design by using only one type of lever member. This would considerably reduce the total manufacturing cost of the device.

By arranging the lever mechanism so that each one of lever members 6, 7 and 8 is composed of a set of lever members, each being parallel to one another as shown in FIG. 3, considerable reduction of the total weight is made without any loss in the strength of the device. However, if desired, the lever members 6, 7 or 8 could simply be composed of only a single lever member each, but this would substantially increase the weight of the tool if the strength were to be maintained.

The angle of the first pressure plate 4 with respect to the lever 1 can be fixed according to how much lifting is required. Since this varies with the size of the tree to be felled, many designs are therefore possible. Based on an average tree typically found in northern climates, this angle is chosen such that the lever 1 extends horizontally from the tree when an approximate 45° saw cut is made. The 45° saw cut angle is convenient to make in practice as well as offers, in conjunction with the design presented in the figures, good tree fiber characteristics for supporting the large resulting forces from the second and third pressure plates 5 and 10. Nevertheless, the range of acceptable saw cuts is wide such that saw cut angles from 20°–75° are possible with the design presented, for example. The logger, therefore, has a large degree of freedom to make the saw cut and even fix the location of the handle bar 2 by taking the cut low or steep. In this way the logger can be spared from unnecessary bending or lifting at inconvenient levels. For example, when felling large trees which have a high stump with roots aboveground, a steeper than 45° saw cut is advantageous. An added advantage with such steeper cuts is received since the device's lifting capacity and even lifting efficiency increases.

The device can also be arranged advantageously with a means for holding the third pressure plate 10 in an actuated position. The prime advantage gained herein is in being able to reduce the resistance of the felling hinge, see FIG. 1, and yet keeping the tree from leaning back and pinching the power saw. By being able to force and keep the saw track in an open position, the logger can proceed to cut a thinner felling hinge. Felling of the three thereafter is efficiently carried out with a single and easy lifting motion. The felling hinge is always necessary for controlling and steering the tree during the directed felling. Another advantage of mechanically keeping the device in an actuated position is in facilitating a second lifting operation to achieve greater lifts, if necessary. The second lifting operation can generally and conveniently be performed on the same inclined surface.

The means for maintaining the device in the actuated position necessary to achieve the aforementioned capabilities can be arranged in a number of ways but are not shown in the accompanying drawings. A simple embodiment of a locking means is a member attached to the lower part of the lever 1, arranged with a means to seize the third pressure plate 10 when in an actuated position. As an example of this type of member, it is suggested that a hook-shaped member be attached to the third pressure plate 10, arranged to interwork with a means of attachment extending from one of the lower punch outs 3, 3' or 3'' in the lever 1. Also, other embodiments are possible. A locking member can be attached at the bolt or axle 9 joining the three sets of lever members 6, 7 and 8, arranged to hold the third set of lever members 8 in a fixed relationship to the second pressure plate 5 when in an actuated position.

It should be emphasized that the embodiments disclosed in the preceding specification and shown in the accompanying drawings only serve as an example of preferred embodiments, since many other emmbodiments are possible within the scope of the invention and the following claims.

What is claimed is:

1. A manually operated mechanical log breaking device comprising
   - a longitudinal extending lever member;
   - a first pressure plate extending from one end portion of said lever member;
   - a second pressure plate joined to said first pressure plate in a hinged relationship;
   - a third pressure plate;
   - a link system interconnecting said third plate and said first and second plates with said third plate spaced from said first and second plates,
     - said link system comprising an axle and three lever members, one end of each of said members being hingedly connected to said axle,
     - said members extending from said axle and being hingedly connected to said first, second and third pressure plates respectively.

2. A manually operated mechanical log breaking device according to claim 1 wherein each of said lever members includes a plurality of corresponding levers arranged in parallel to each other.

3. A manually operated mechanical log breaking device according to claim 1 wherein said first pressure plate is arranged at an angle to the manually operated lever member.

4. A manually operated mechanical log breaking device according to claim 1 wherein the manually operated lever member is arranged with a number of elongated openings the length of said openings increasing from the lever's junction with the first pressure plate towards the point of the manually applied force.

5. A manually operated mechanical log breaking device comprising
   - a longitudinally extending lever member;
   - a first pressure plate extending from one end portion of said lever member;
   - a second pressure plate joined to said first pressure plate in a hinged relationship;
   - a third pressure plate;

a link system interconnecting said third plate and said first and second plates with said third plate spaced from said first and second plates, said link system comprising three sets of lever members joined together at one end portion and extending from the joining point to said first, second and third pressure plates respectively, said third pressure plate being fixed by means of at least one resilient member at a predetermined angle and distance from the first and second pressure plates when said first and second pressure plates are arranged in line with each other.

6. A manually operated mechanical log breaking device comprising a longitudinally extending lever member;

a first pressure plate extending from one end portion of said lever member;

a second pressure plate joined to said first pressure plate in a hinged relationship;

a third pressure plate;

a link system interconnecting said third plate and said first and second plates with said third plate spaced from said first and second plates, said link system comprising three sets of lever member joined together at one end portion and extending from the joining point to said first, second and third pressure plates respectively, said pressure plates being provided with outwardly extending means from the contact surfaces of the pressure plates for increasing the frictional contact.

7. A manually operated mechanical log breaking device according to claim 1 and further comprising a locking member to hold the lever members attached to the third pressure plate is a fixed position relative to the second pressure plate when the device is in an actuated position.

8. A manually operated mechanical log breaking device according to claim 1 wherein said lever members linking the pressure plates together are identical.

*9. A manually operated mechanical log breaking device comprising*

*a longitudinally extending lever means;*

*a first pressure plate extending from one end portion of said lever means;*

*a second pressure plate pivotally coupled to said first pressure plate and having means on one surface thereof for engaging a saw cut in a log;*

*a pressure member; and*

*a link system interconnecting said pressure member and said first and second pressure plates with said pressure member spaced from said first and second pressure plates, said link system comprising*

*an axle, and*

*at least two lever members, said pressure member and one end of each of said lever members being pivotally coupled to said axle, the other end of each of said lever members being pivotally coupled to said first and second pressure plates, respectively.*

*10. A manually operated mechanical log breaking device according to claim 9, wherein each of said lever members includes a plurality of corresponding levers arranged in parallel to each other.*

*11. A manually operated log breaking device according to claim 9, wherein said pressure member has means for engaging a saw cut on one surface thereof.*

*12. A manually operated log breaking device according to claim 11, wherein said means for engaging a saw cut comprises a plurality of projections.*

* * * * *